United States Patent Office 3,404,776
Patented Oct. 8, 1968

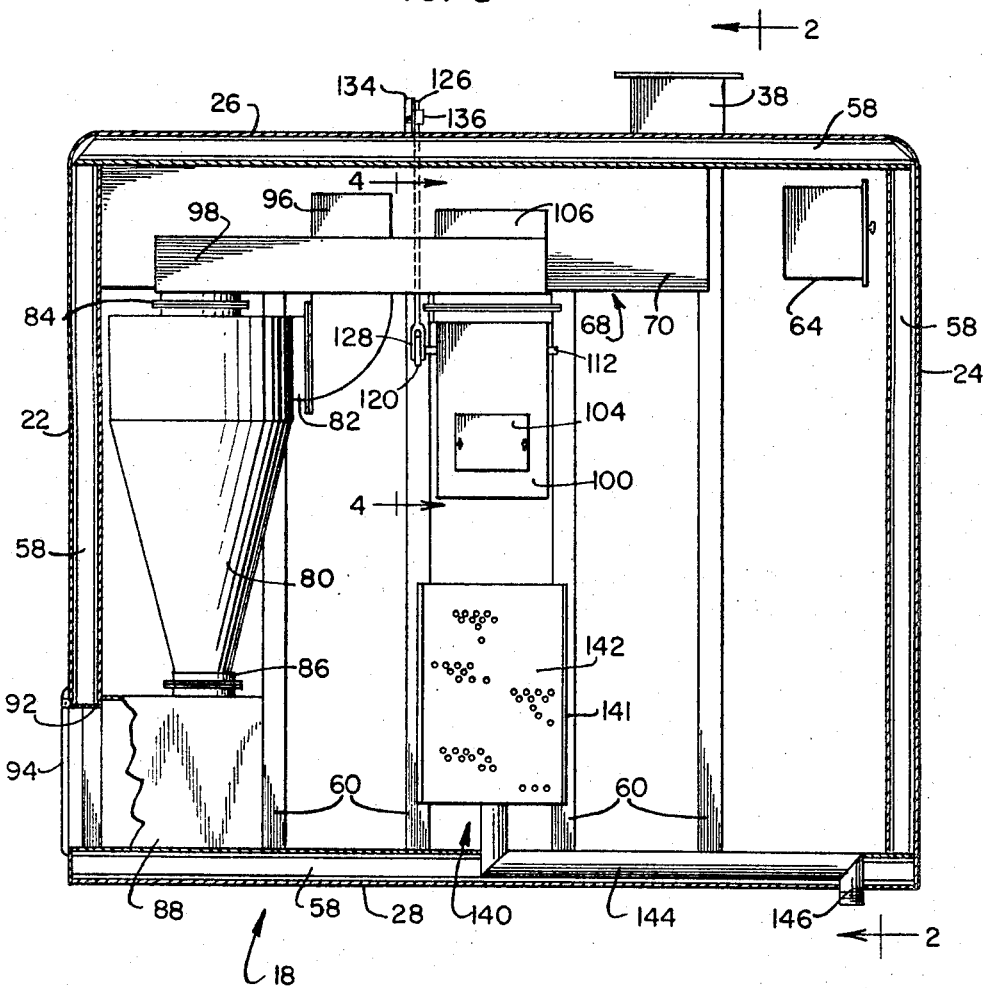

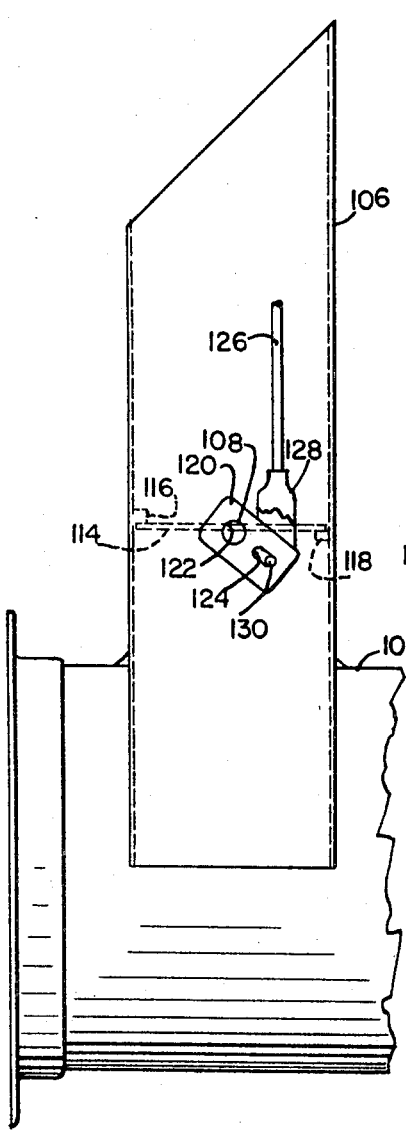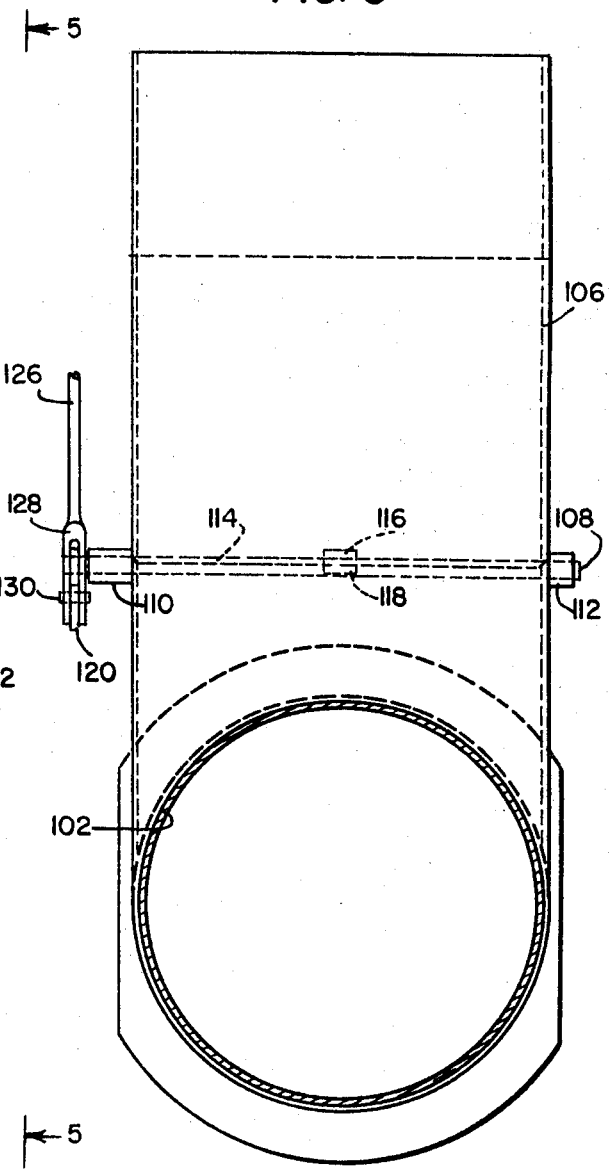

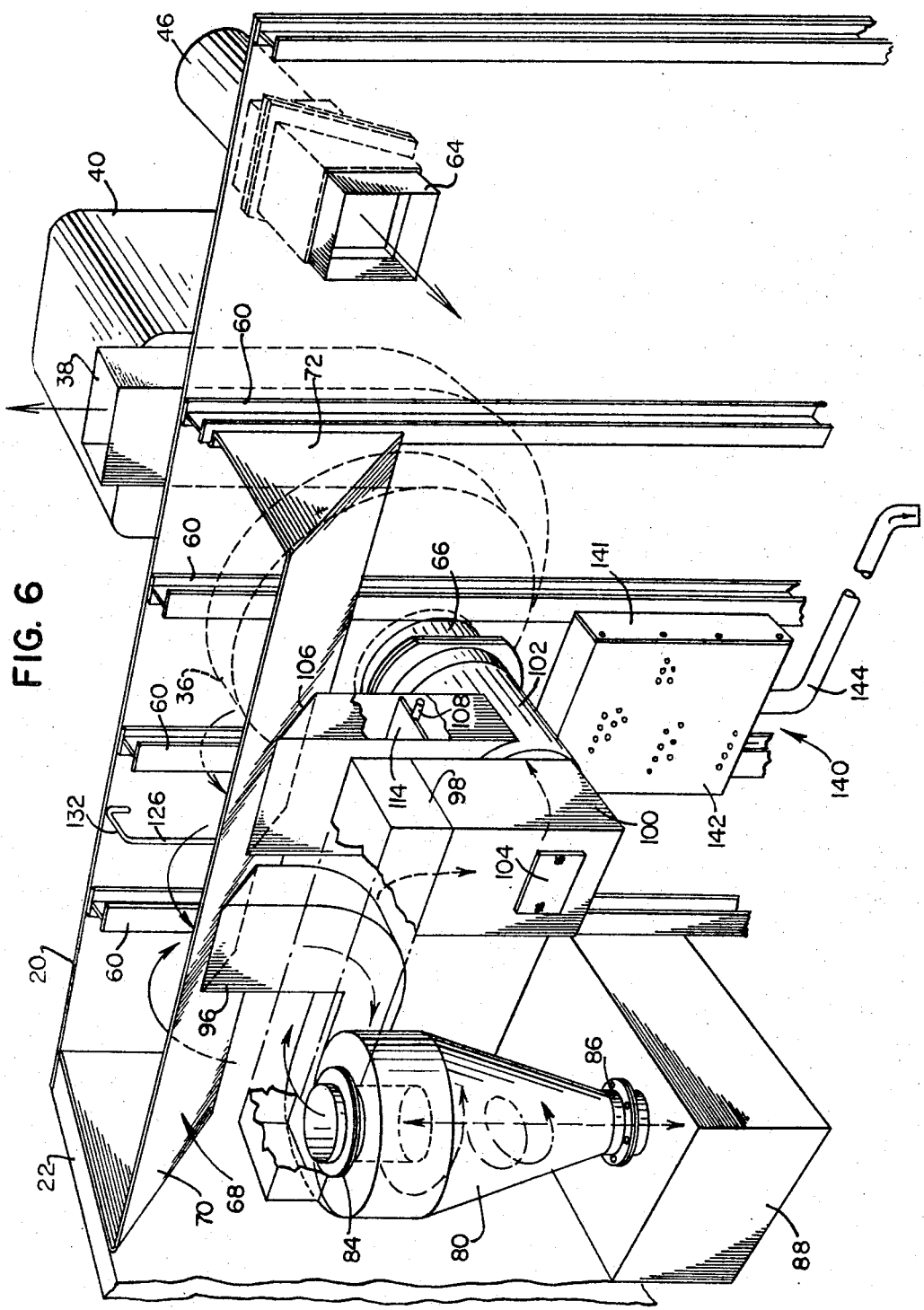

3,404,776
APPARATUS FOR COLLECTING LOOSE MATERIALS IN A PORTABLE COLLECTOR
Roland E. Shaddock, Streator, Ill., assignor to The Myers-Sherman Company, Streator, Ill., a corporation of Illinois
Filed Aug. 10, 1966, Ser. No. 571,496
6 Claims. (Cl. 209—135)

ABSTRACT OF THE DISCLOSURE

A vehicular collector for loose materials including a collecting box having a vacuum expansion chamber therein and a door for emptying the chamber. A materials inlet to the chamber and air outlet means from the chamber are disposed in the same wall of the collection box. A cyclone separator is disposed in the chamber and has an air inlet means in communication with the chamber and an air outlet means connected to the air chamber outlet means. A compressor is connected to the air chamber outlet means for establishing suction flow of an air stream initially containing loose material in a flow path from the materials inlet, through the chamber and the separator, to the chamber air outlet means for depositing the loose material in the chamber and separating entrained material in the separator. Additional means is interposed between the separator and the chamber air outlet means for selectively bypassing the flow of air around the separator and directly out the chamber air outlet means.

---

This invention relates to apparatus for collecting loose materials in a portable collector. More particularly, the invention relates to apparatus for collecting loose materials in a portable vacuum chamber such as may be mounted on a vehicle.

Refuse collecting vehicles employing a suction system for picking up loose materials is in widespread use for cleaning catch basins, picking up leaves and street sweeper dump piles, picking up litter and trash, and performing other similar operations. Loose materials are picked up by a suction nozzle and conveyed in an air stream to a collecting box, where the materials are deposited. It has been difficult to separate solid materials from the air stream satisfactorily owing to the limited space available in a portable unit. For example, filter screens have been employed for separating the solids. The screens easily become plugged and must be cleaned or replaced frequently. When the screens are partially plugged, the efficiency of the operation is reduced, and the equipment will not operate at optimum capacity. The air cleaning system cannot be bypassed for better suction in a filter system.

An important object of the present invention is to provide apparatus for separating loose materials from an air stream in a portable collector, more particularly, in a vacuum chamber of a vehicular collector for loose materials, which overcome prior problems and furnish significant advantages over the prior methods and apparatus.

A particular object is to provide apparatus for separating loose materials from an air stream and collecting the materials in the limited space available in a portable collector, which obviate the use of filter screens and overcomes the disadvantages thereof.

Another object is to provide apparatus of the foregoing character in which the vacuum chamber is employed as the primary separating chamber, and entrained material is separated in a cyclone or centrifugal separator. Alternatively, the separator may be bypassed when it is unnecessary to separate entrained material.

An additional object is to provide apparatus accomplishing the foregoing objects and which operate at a high rate of flow of materials, provide a high capacity for storage of materials, and provide efficient, economical, and trouble-free operation.

These and other objects, advantages and functions of the invention will be apparent on reference to the specification and to the attached drawings illustrating a preferred embodiment of the invention, wherein like parts are identified by like reference symbols in each of the views, and wherein:

FIG. 3 is an enlarged cross sectional view thereof, with parts broken away, taken on line 3—3 of FIG. 2;

FIG. 4 is a further enlarged elevational view of part of the apparatus shown in FIG. 3, with parts broken away, taken on line 4—4 thereof;

FIG. 5 is a similarly enlarged elevational and sectional view of the apparatus shown in FIG. 4, taken on line 5—5 thereof; and FIG. 6 is a schematic perspective view of the apparatus shown in the preceding views, illustrating the operation thereof.

Figure 1:
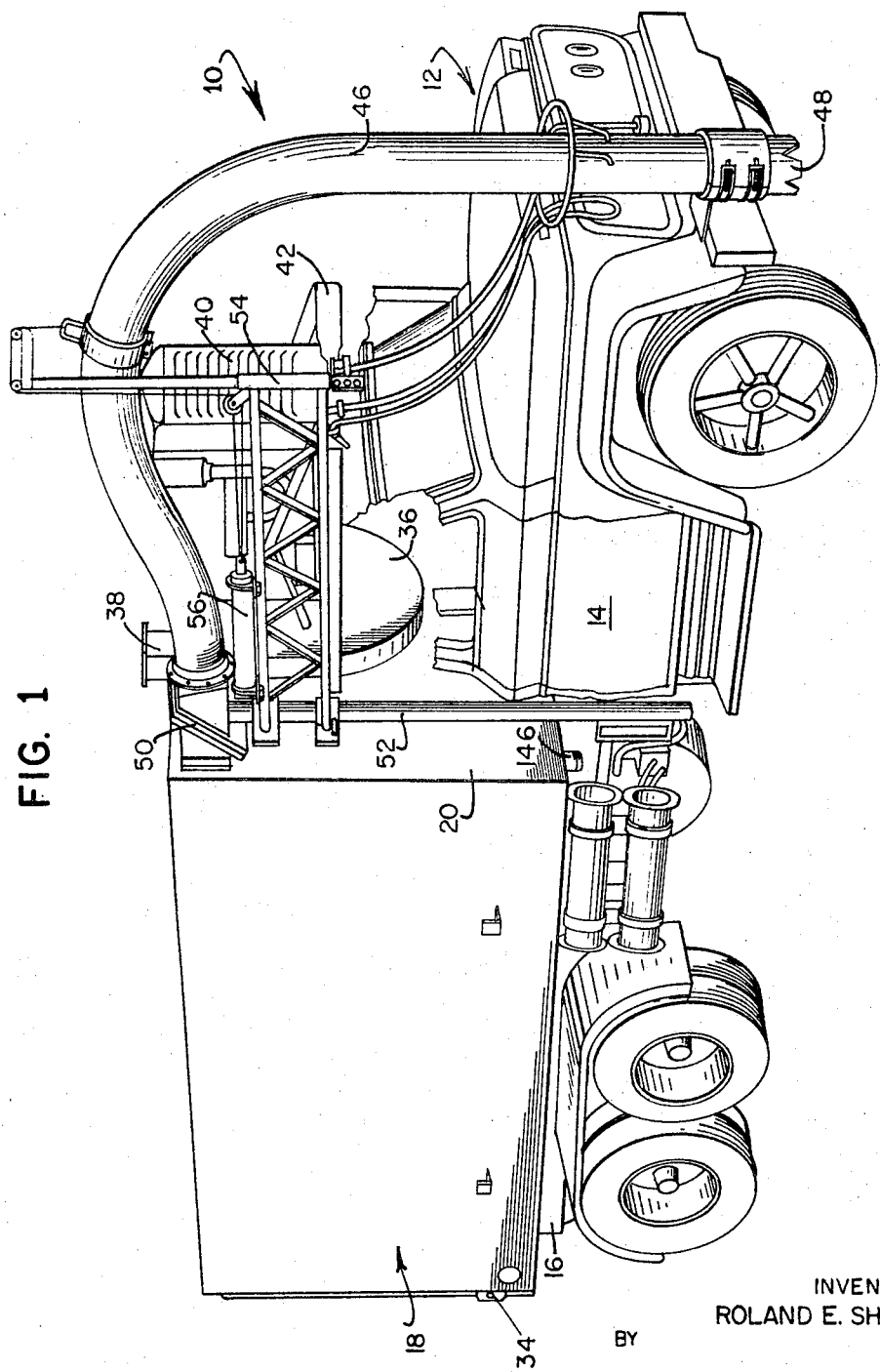
FIG. 1 is a perspective view with parts broken away of a vehicular collector for loose materials embodying the invention.

Referring to the drawings, particularly FIG. 1, a vehicular collector 10 embodying the invention includes a truck body 12 having a cab 14 and a bed 16, and a collecting box or container 18 mounted on the bed. The truck body has the conventional structure of a dump truck, and the collecting box is mounted on the bed thereof in a conventional manner for dumping the contents of the box by raising the front end of the box.

Figure 2:
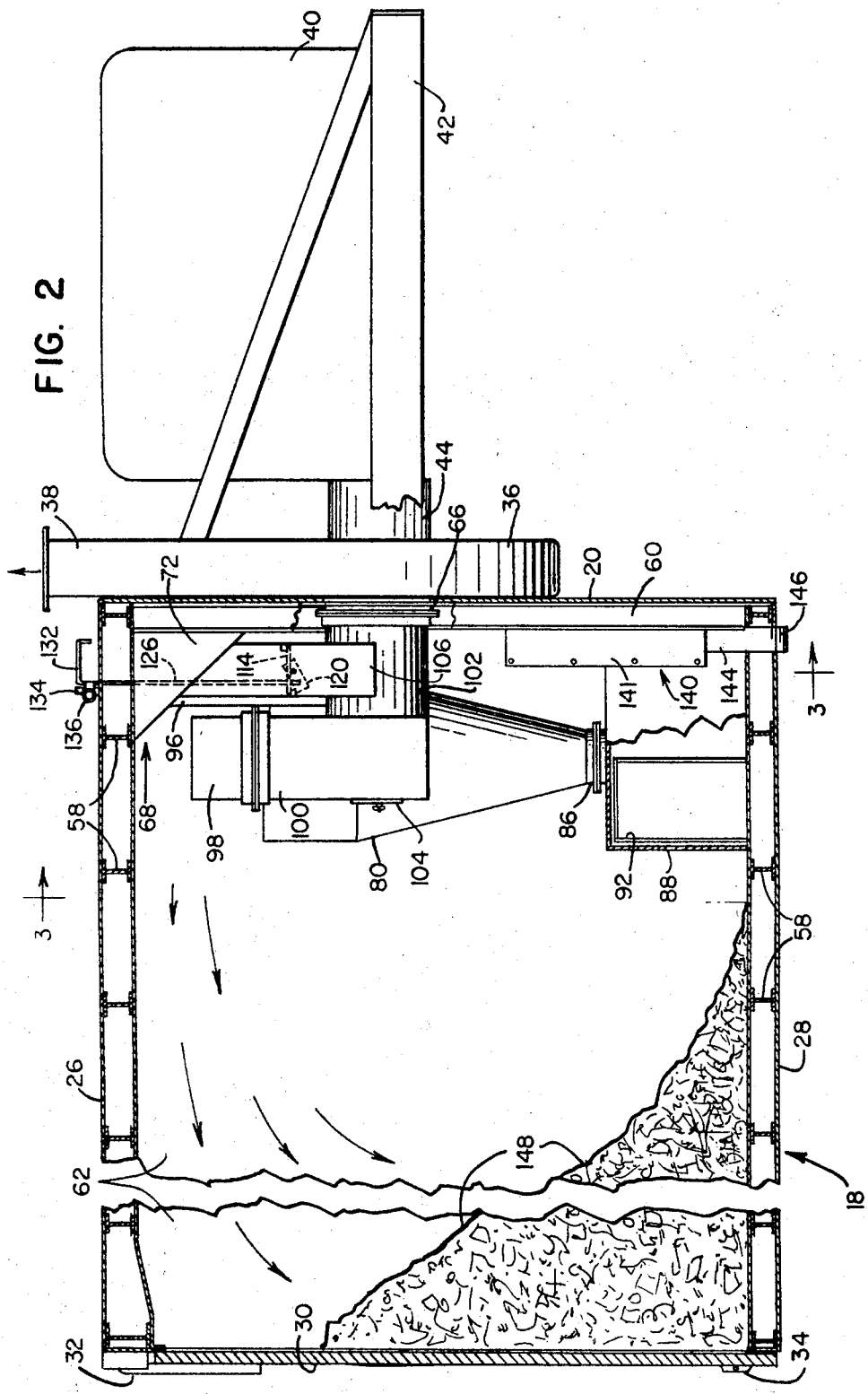
FIG. 2 is an enlarged broken vertical longitudinal sectional view thereof, with parts broken away, taken on line 2—2 of FIG. 3.

Referring also in FIGS. 2 and 3, the collecting box 18 includes a front wall 20, side walls 22 and 24, and top and bottom walls 26 and 28. A door 30 is mounted on the rear end of the box, by conventional hinge structure 32 at the top of the box. Conventional latch mechanism 34 is provided for securing the bottom of the door to the box, and it is unlatched for dumping.

Various apparatus is mounted externally on the front wall 20 of the collecting box and extends over the truck cab 14, for performing functions pertaining to the present invention and other functions. A high capacity centrifugal compressor 36 is mounted on the front wall, and it is provided with a discharge duct 38 projecting above the top wall 26 of the collecting box. An internal combustion engine 40 is mounted over the cab, on a supporting framework 42 secured to the front wall 20. The engine is drivingly connected to the compressor by a conventional transmission 44.

A flexible intake hose 46 provided with an intake nozzle 48 is connected to the collecting box 18 through a compensating seal 50 having a water drain 52, all of conventional construction. The intake hose is mounted for adjustment of its position on a swinging boom assembly 54 provided with control mechanism 56 for raising and lowering the hose.

As illustrated in FIGS. 2 and 3, the side, top and bottom walls 22, 24, 26 and 28 are of double wall construction reinforced with enclosed I-beams 58. The front wall 20 is of single wall construction reinforced with internally exposed I-beams 60. The several walls and the door 30 form a vacuum expansion chamber 62 in the collecting box.

A materials inlet 64 is provided in an upper corner of the front wall 20. The intake hose 46 is connected to the inlet through the seal 50. An air outlet 66 is provided at about the center of the front wall 20, and it also constitutes an inlet for the compressor 36. A baffle 68 is mounted in the chamber 62 at the top of the front wall. The baffle includes a plate 70 extending transversely for the greater part of the width of the chamber, from one side of the inlet 64 to the side wall 22. The plate is upwardly and rearwardly inclined from the front wall I-beams 60 to the top wall 26. The inner end of the baffle is closed by an end plate 72 secured to the transverse plate and to an I-beam 60. The space enclosed by the baffle and the front wall 20 is in communication with the remainder of the chamber at the bottom of the baffle, between the front wall I-beams 60 serving as spacers from the remainder of the front wall.

A cyclone or centrifugal separator 80 is mounted in the chamber 62 adjacent to the front and side walls 20 and 22. The separator is provided with an air inlet 82 into the upper end thereof, an air outlet 84 in the top thereof, and a solids outlet 86 at the bottom thereof. The separator is mounted on a receptacle 88 for discharging solids thereinto. The receptacle is mounted on the bottom wall 28 in the corner formed by the front and side walls 20 and 22, and is bounded by the several walls. A discharge outlet 92 in the side wall 22 communicates with the interior of the receptacle. A door 94 is mounted on the side wall for opening and closing the discharge outlet.

A supply duct 96 is connected to the separator air inlet 82 and to the transverse plate 70 of the baffle 68, to place the inlet in communication with the chamber 62 between the baffle and the front wall 20. An air discharge duct 98 is connected to the separator air outlet 84 and to a connecting duct 100. The connecting duct is joined to the chamber air outlet 66 by a manifold duct 102. An access door 104 is provided on the connecting duct, in line with the manifold duct.

A bypass duct 106 is connected to the transverse plate 70 of the baffle 68 and to the manifold duct 102, for placing the chamber air outlet 66 in direct communication with the chamber between the baffle and the front wall 20. As illustrated in greater detail in FIGS. 4 and 5, a control shaft 108 is mounted in the bypass duct and is journaled in sleeves 110 and 112 mounted on opposite outer surfaces of the duct. A closure plate or baffle 114 is secured to the shaft in the duct. The closure plate rotates with the shaft for opening and closing the duct. Stop bars 116 and 118 are mounted on opposite walls of the duct to locate the closure plate in its closed position.

A control lever 120 is provided for rotating the control shaft 108. A circular opening 122 and a slot 124 are provided in the lever adjacent opposite ends thereof. One end of the control shaft 108 is received in the circular opening, and the shaft is secured to the lever, as by welding. A control rod 126 is connected to the lever by a yoke 128 and a yoke pin 130 extending through the slot 124. As seen in FIGS. 2 and 3, the control rod extends through the top wall 26 and is bent to form a handle 132 at its outer end. The rod is vertically adjustably supported on a preforated angle bar holder 134 on the top wall, by a latch pin and bracket assembly 136 on the rod. The rod is raised and lowered for opening and closing the bypass duct 106 by rotation of the closure plate 114.

A drain assembly 140 including a liquid receiver box 141 is mounted on two I-beams 60 of the front wall 20. A perforated filter screen 142 forms the rear wall of the box, and it separates liquid from solid material. A drain pipe 144 is connected to the bottom of the box in communication with the interior thereof, and it extends transversely in the bottom wall 28. The pipe terminates adjacent to a side wall 24 in a threaded outlet 146 extending below the bottom wall.

The collector 10 may be used to pick up and collect various loose solid, liquid, and mixed solid and liquid materials. Refuse, such as debris in catch basins, trash, leaves, and wood chips, and useful materials, such as salt and cinders to be spread on roads, may be collected.

In operation, the engine 40 drives the compressor 36 to establish a partial vacuum in the chamber 62 and a high suction force at the restricted opening of the intake nozzle 48 on the hose 46. The nozzle is placed next to the loose material to be picked up, and the material is sucked into the vacuum chamber in a high velocity stream of air. The air stream containing loose material is directed to the rear end of the chamber, against the door 30 thereat. The air expands rapidly as it enters the vacuum chamber, reducing its velocity to allow the larger and heavier particles to separate from the air stream, fall to the bottom of the chamber and collect on the bottom wall 28 in a pile 148. Light materials such as leaves become packed in tightly as they accumulate. The air stream returns to the front wall 20.

In picking up various materials containing smaller and lighter dust particles and other relatively fine material, the fines that do not settle are entrained in the returning air stream. The air stream flows upwardly between the front wall I-beams 60 into the space between the baffle 68 and the front wall. With the bypass duct 106 closed by the closure plate 114, the air flows into the separator supply duct 96 and into the separator 80. The velocity of the air stream increases as it enters the separator, and the air stream follows a helical curvilinear flow path in the separator. The entrained material is separated from the air stream by centrifugal force and drops down the separator wall to the solids outlet 86 and into the receptacle 88. The air stream free of entrained material flows upwardly and out of the separator air outlet 84 into the air discharge duct 98. The air stream then flows into the connecting duct 100, into the manifold duct 102, and into the air outlet 66, from whence it enters the compresosr 36 and is discharged to the atmosphere through discharge duct 38.

Some of the material handled by the collector 10 does not contain small particle size dry material that must be separated from the air stream. For example, liquids may be picked up and collected in the vacuum chamber 62, and no solid material is entrained in the air stream. In such cases, the bypass duct 106 is opened by rotating the closure plate 114 therein. The adjustment is made by operating the control rod 126 from the top of the box. The air stream then flows from between the baffle 68 and the front wall 20 into the bypass duct, into the manifold duct 102, and into the compressor 36, from whence the air is discharged. A greater suction force is exerted at the intake nozzle 48 when the resistance afforded by the separator 80 is removed by bypassing the separator in this manner.

When wet solid material is collected, water may be drained from the chamber 62 through the drain assembly 140. A hose may be connected to the drain pipe outlet 146 to discharge the water to a sewer. The drain may may close when collecting liquids, such as by capping the outlet.

In order to discharge the contents of the collecting box 18, as when the chamber 62 is filled to capacity, the back door 30 is opened, and the box is dumped. The side door 94 leading to the separator receptacle 88 is opened at this time for emptying the receptacle.

The high velocity, low pressure system employing the centrifugal compressor 36 and the cyclone separator 80 rapidly and efficiently picks up and collects various loose materials and then separates entrained materials from a relatively low volume of air discharged to the atmosphere. Thus, for example, employing an engine 40 delivering 89 horsepower and a compressor having an 38 inch diameter tapered aluminum wheel, air passes through the compressor at rate of 2500 cubic feet per minute with an operating pressure of 52 ounces per square inch. Material is drawn into a 20 cubic yard capacity collecting box 18. A small diameter separator 80 removes 100% of all particles 1/16 inch in diameter with a density of 0.3 or higher, and finer material up to 99% separation of all particles 0.001 inch in diameter having a density of 0.3. No filters or moving parts are required for controlling dust, and there are no filter screens to inspect, clean, or replace. The only maintenance necessary is to empty the separator receptacle 88 each time the box is dumped.

While a preferred embodiment of the apparatus of the invention have been described and illustrated, it will be apparent to those skilled in the art that various changes and modifications may be made therein within the spirit and scope of the invention. It is intended that such changes and modifications be included within the scope of the appended claims.

What is claimed is:

1. In a vehicular collector for loose materials, a collecting box having a vacuum expansion chamber therein and a door for emptying the chamber, means providing a materials inlet to said chamber, means providing an air outlet from said chamber, a cyclone separator in said chamber having air inlet means in communication with said chamber and air outlet means connected to said chamber air outlet means, a compressor connected to said chamber air outlet means for establishing suction flow of an air stream initially containing loose material in a flow path from said materials inlet through said chamber and said separator to said chamber air outlet means for depositing the material in the chamber and separating entrained material in the separator, and means interposed between said separator and said chamber air outlet for selectively bypassing the flow of air around said separator and directly out said chamber air outlet means.

2. A collector as defined in claim 1 including a baffle in said chamber adjacent one end thereof for directing the flow of air to said separator inlet and to said bypass means.

3. In a vehicular collector for loose materials, a collecting box having a vacuum expansion chamber therein and a door at one end for emptying the chamber, means providing a materials inlet to said chamber at an opposite end adjacent to the top thereof, a flexible intake hose connected to said materials inlet means, means providing an air outlet from said chamber, a baffle in said chamber at said opposite end adjacent the top thereof, a cyclone separator in said chamber having air inlet means, air outlet means, and solids outlet means, first duct means placing said separator inlet means in communication with said chamber between said baffle and said chamber opposite end, second duct means connecting said separator air outlet means to said chamber air outlet means, third duct means placing said chamber air outlet means in communication with said chamber between said baffle and said chamber opposite end and bypassing said separator, a closure mounted for movement to open and close said third duct means, means associated with said closure and operable externally of said chamber for moving said closure, a receptacle in said chamber connected to said separator solids outlet means, means providing a discharge outlet in a chamber wall communicating with the interior of said receptacle, a door on said box for opening and closing said discharge outlet, and a compressor mounted on said box and connected to said chamber air outlet means for establishing suction flow of an air stream initially containing loose material in a flow path from said hose to said materials inlet, through said chamber from said opposite end thereof to said one end and returning to said opposite end, and to said chamber air outlet for depositing the material in the chamber, said flow path following a course through said first duct means and said separator to said chamber air outlet with said third duct means closed for separating entrained material, and through said third duct means to said chamber air outlet with said third duct means open for bypassing said separator.

4. In a vehicular collector for loose materials, a portable collecting box having a vacuum expansion chamber therein, means for placing said chamber in communication with a source of material to be collected, means for establishing high velocity suction flow of an air stream containing said material in a flow path from said material source to said chamber, means for establishing low velocity suction flow of said air stream in a flow path through said chamber from one end to an opposite end thereof and returning to said one end to deposit said material in said chamber, means in said chamber for establishing a high velocity suction flow of the returning air stream in a curvilinear flow path to separate entrained material from the air stream by centrifugal force, and means thereafter discharging the air stream from the chamber.

5. In a vehicular collector for loose materials, a collecting box having a vacuum expansion chamber therein and a door at one end for emptying the chamber, means providing a materials inlet to said chamber at an opposite end thereof, means providing an air outlet from said chamber, a baffle in said chamber at said opposite end, a cyclone separator in said chamber having air inlet means, air outlet means, and solids outlet means, first duct means placing said separator inlet means in communication with said chamber between said baffle and said chamber opposite end, second duct means connecting said separator air outlet means to said chamber air outlet means, third duct means placing said chamber air outlet means in communication with said chamber between said baffle and said chamber opposite end and bypassing said separator, a closure mounted for movement to open and close said third duct means, means associated with said closure and operable externally of said chamber for moving said closure, and a compressor mounted on said box and connected to said chamber air outlet means for establishing suction flow of an air stream initially containing loose material in a flow path into said materials inlet, through said chamber from said opposite end thereof to said one end and returning to said opposite end, and to said chamber air outlet for depositing the material in the chamber, said flow path following a course through said first duct means and said separator to said chamber air outlet with said third duct means closed for separating entrained material, and through said third duct means to said chamber air outlet with said third duct means open for bypassing said separator.

6. In a vehicular collector for loose materials, a collecting box having a vacuum expansion chamber therein and a door at one end for emptying the chamber, means providing a materials inlet to said chamber at an opposite end thereof, means providing an air outlet from said chamber, a baffle in said chamber at said opposite end, a cyclone separator in said chamber having air inlet means, air outlet means, and solids outlet means, first duct means placing said separator inlet means in communication with said chamber between said baffle and said chamber opposite end, second duct means connecting said separator air outlet means to said chamber air outlet means, a receptacle in said chamber connected to said separator solids outlet means, means providing a discharge outlet in the chamber wall communicating with the interior of said receptacle, a door on said box for opening and closing said discharge outlet, and a compressor mounted on said box and connected to said chamber air outlet means for establishing suction of an air stream initially containing loose material in a flow path into said materials inlet, through said chamber from said opposite end thereof to said one end and returning to said opposite end, and to said chamber air outlet for depositing the material in the chamber, said flow path following a course through said first duct means and said separator to said chamber air outlet for separating entrained material.

(References on following page)

References Cited

UNITED STATES PATENTS

| | | | |
|---|---|---|---|
| 1,448,482 | 3/1923 | Christiansen | 209—143 |
| 2,047,568 | 7/1936 | Lissman | 209—135 |
| 2,471,326 | 5/1949 | Hoyt | 209—144 |
| 2,708,487 | 5/1955 | Hedberg et al. | 55—125 |
| 2,850,162 | 9/1958 | Widmer | 209—143 X |

FOREIGN PATENTS

| | | |
|---|---|---|
| 1,054,401 | 10/1953 | France. |
| 729,319 | 12/1942 | Germany. |
| 428,203 | 12/1947 | Italy. |
| 300,857 | 9/1965 | Netherlands. |

HARRY B. THORNTON, *Primary Examiner.*

TIM R. MILES, *Assistant Examiner.*

UNITED STATES PATENT OFFICE
CERTIFICATE OF CORRECTION

Patent No. 3,404,776                          October 8, 1968

Roland E. Shaddock

It is certified that error appears in the above identified patent and that said Letters Patent are hereby corrected as shown below:

Column 2, line 39, "in" should read -- to --. Column 3, line 63, "preforated" should read -- perforated --. Column 4, line 39, "compresosr" should read -- compressor --; line 60, "may close" should read -- be closed --; line 73, "an" should read -- a --; line 75, after "at" insert -- the --. Column 6, line 67, after "suction" insert -- flow --.

Signed and sealed this 17th day of February 1970.

(SEAL)
Attest:

Edward M. Fletcher, Jr.                      WILLIAM E. SCHUYLER, JR.
Attesting Officer                              Commissioner of Patents